(12) United States Patent
Weng et al.

(10) Patent No.: US 10,891,609 B2
(45) Date of Patent: Jan. 12, 2021

(54) TRANSACTION CARD AND INFORMATION DISPLAYING METHOD

(71) Applicant: ADVANCED NEW TECHNOLOGIES CO., LTD., Grand Cayman (KY)

(72) Inventors: Xinyu Weng, Hangzhou (CN); Kunkun Zheng, Hangzhou (CN); Huanmi Yin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/890,543

(22) Filed: Jun. 2, 2020

(65) Prior Publication Data

US 2020/0294027 A1    Sep. 17, 2020

Related U.S. Application Data

(63) Continuation of application No. PCT/CN2019/080025, filed on Mar. 28, 2019.

(30) Foreign Application Priority Data

Jun. 25, 2018   (CN) .......................... 2018 1 0664382

(51) Int. Cl.
*G06Q 20/00* (2012.01)
*G06Q 20/32* (2012.01)
(Continued)

(52) U.S. Cl.
CPC ... *G06Q 20/3274* (2013.01); *G06K 19/07707* (2013.01); *G06Q 20/352* (2013.01)

(58) Field of Classification Search
CPC ............ G06Q 20/3274; G06Q 20/352; G06K 19/07707
(Continued)

(56) References Cited

U.S. PATENT DOCUMENTS

| 5,404,000 A | 4/1995 | Nair et al. |
| 6,202,155 B1 | 3/2001 | Tushie et al. |

(Continued)

FOREIGN PATENT DOCUMENTS

| CN | 103927652 A | 7/2014 |
| CN | 104599113 A | 5/2015 |

(Continued)

OTHER PUBLICATIONS

International Search Report and Written Opinion for Application No. PCT/CN2019/080025, dated Jun. 27, 2019, 9 pages.
(Continued)

*Primary Examiner* — Daniel A Hess (57) ABSTRACT

Disclosed are a transaction card and an information displaying method. The transaction card includes a card body, a power supply, a graphic code generation circuit, and a display device. The power supply, the graphic code generation circuit, and the display device are embedded within the card body. The power supply is connected to the graphic code generation circuit and the display device. The graphic code generation circuit is configured to generate a graphic transaction code based on transaction account information of a user. The display device is configured to display the graphic transaction code.

13 Claims, 3 Drawing Sheets

(51) Int. Cl.
*G06K 19/077* (2006.01)
*G06Q 20/34* (2012.01)

(58) Field of Classification Search
USPC .......................................................... 235/380
See application file for complete search history.

(56) References Cited

U.S. PATENT DOCUMENTS

| | | |
|---|---|---|
| 7,121,470 B2 | 10/2006 | McCall et al. |
| 7,451,917 B2 | 11/2008 | McCall et al. |
| 7,669,772 B2 | 3/2010 | Smets et al. |
| 7,819,321 B2 | 10/2010 | Faith et al. |
| 8,060,915 B2 | 11/2011 | Voice et al. |
| 8,360,332 B2 | 1/2013 | Poidomani et al. |
| 8,447,666 B1 | 5/2013 | Keld |
| 8,459,548 B2 | 6/2013 | Mullen et al. |
| 8,612,757 B2 | 12/2013 | Chiviendacz et al. |
| 9,882,916 B2 | 1/2018 | Hu |
| 10,121,140 B2 | 11/2018 | Sperduti et al. |
| 10,275,762 B2 | 4/2019 | Faith et al. |
| 2003/0132293 A1 | 7/2003 | Fitch et al. |
| 2005/0140497 A1 | 6/2005 | Chiviendacz et al. |
| 2008/0217396 A1 | 9/2008 | Boalt |
| 2008/0222047 A1 | 9/2008 | Boalt |
| 2012/0168500 A1 | 7/2012 | Li |
| 2012/0286928 A1 | 11/2012 | Mullen et al. |
| 2013/0081127 A1* | 3/2013 | Chen .................... G06Q 20/341 726/9 |
| 2013/0151402 A1 | 6/2013 | Howard |
| 2014/0201016 A1 | 7/2014 | Chou |
| 2016/0012428 A1 | 1/2016 | Haldenby et al. |
| 2016/0140545 A1* | 5/2016 | Flurscheim ......... H04L 63/0838 705/76 |
| 2016/0335531 A1 | 11/2016 | Mullen et al. |

FOREIGN PATENT DOCUMENTS

| | | |
|---|---|---|
| CN | 204497771 U | 7/2015 |
| CN | 103929402 B | 12/2016 |
| CN | 106203586 A | 12/2016 |
| CN | 106339938 A | 1/2017 |
| CN | 107341658 A | 11/2017 |
| CN | 108596606 A | 9/2018 |
| EP | 1480476 B1 | 11/2004 |
| TW | 201227527 A | 7/2012 |
| WO | 1989/008899 A1 | 9/1989 |
| WO | 1994/019777 A1 | 9/1994 |
| WO | 2004/029889 A1 | 4/2004 |

OTHER PUBLICATIONS

Search Report dated Dec. 10, 2018, issued in related Taiwan Application No. 108107617 (1 page).

* cited by examiner

TRANSACTION CARD AND INFORMATION DISPLAYING METHOD

CROSS-REFERENCE TO RELATED APPLICATIONS

This application is a continuation application of International Application No. PCT/CN2019/080025, filed on Mar. 28, 2019, which claims priority to and benefit of Chinese Application No. 201810664382.6, filed on Jun. 25, 2018, all of which are incorporated herein by reference in their entirety.

TECHNICAL FIELD

The specification relates to the field of computer technology, and in particular, to a transaction card and an information displaying method.

BACKGROUND

An offline payment refers to a transaction where a user makes a payment without a network connection. The offline payment may generally be made by the user showing an identity card (such as a bank card) to a payment object. The identity card stores transaction account information of the user. The user swipes a card at a card swiping terminal to complete a payment.

An offline payment method through a bank card and so on requires a relatively low security level of a transaction account of the user. By swiping a card, relevant information of the transaction account is easily intercepted, resulting in a loss to the transaction account of the user. In addition, when there is a small remaining sum in a payment card, the user is required to frequently go to a designated bank outlet to recharge the payment card, wasting a lot of time of the user, and thereby resulting in relatively low payment efficiency. Therefore, in the field of the offline payment, especially in a case that a terminal device (such as a mobile phone or a tablet) cannot be carried, a more stable, secure, and efficient payment solution is required.

SUMMARY

Embodiments of the specification are intended to provide a transaction card and an information displaying method, to provide a more stable, more secure, and more efficient payment solution.

In order to implement the solution, embodiments of the specification are implemented in a manner below:

Various embodiments provide a transaction card corresponding to a server that provides a transaction service. The transaction card includes: a card body, a power supply, a communication circuit, a graphic code generation circuit, and a display device. The power supply, the graphic code generation circuit, and the display device are embedded within the card body, and the power supply is connected to the graphic code generation circuit and the display device. The communication circuit is connected to the power supply, the graphic code generation circuit, and the display device, and configured to receive target information sent by the server for the transaction card and/or sending a target request message to the server. The communication circuit includes a near field communication circuit configured to communicate with a user terminal via a near field communication connection. The graphic code generation circuit is configured to generate, when the transaction card is not connected to the server, a graphic transaction code based on transaction account information of a user. The graphic code generation circuit periodically generates a new graphic transaction code, and replaces the graphic transaction code displayed by the display device with the new graphic transaction code. The graphic code generation circuit is further configured to generate a first graphic transaction code and a second graphic transaction code, wherein the second graphic transaction code is a graphic payment collection code, and the first graphic transaction code is a graphic payment code. The display device is configured to display the graphic transaction code and the new graphic transaction code.

In some embodiments, the communication circuit includes one or more of a Wi-Fi module, a near field communication circuit, and a radio frequency module.

In some embodiments, the transaction card further includes a positioning module. The positioning module is connected to the power supply and the display device, and is configured to acquire current location information, which is displayed through the display device.

In some embodiments, the transaction card further includes a function button. The function button is connected to the power supply, the display device, and the communication circuit. After the function button is pressed, information corresponding to the function button is sent from the server through the communication circuit, and the information corresponding to the function button is displayed through the display device.

In some embodiments, the second graphic transaction code is disposed in a predetermined area of the transaction card.

In some embodiments, the display device includes electronic paper.

In some embodiments, the graphic transaction code is a bar code, a QR code, or a password code.

An information displaying method applied to a transaction card is provided. The transaction card corresponds to a server that provides a transaction service and includes a card body, a power supply, a communication circuit, a graphic code generation circuit, and a display device. The power supply, the communication circuit, the graphic code generation circuit, and the display device are embedded within the card body. The power supply is connected to the communication circuit, the graphic code generation circuit and the display device. The method comprises: acquiring, by the communication circuit, the transaction account information of a user; generating, by the graphic code generation circuit when the transaction card is not connected to the server, a graphic transaction code based on the transaction account information; and displaying, by the display device, the graphic transaction code. The graphic code generation circuit periodically generates a new graphic transaction code, and replaces the graphic transaction code with the new graphic transaction code. The graphic code generation circuit is further configured to generate a first graphic transaction code and a second graphic transaction code. The second graphic transaction code is a graphic payment collection code, and the first graphic transaction code is a graphic payment code.

In some embodiments, after the acquiring transaction account information of the user, the method further includes: sending, to the server, a graphic code generation request carrying the transaction account information; and receiving, from the server, a response message corresponding to the graphic code generation request, the response message comprising verification information for generating the graphic transaction code.

In some embodiments, the generating a graphic transaction code based on the transaction account information includes: the generating, by the graphic code generation circuit, the graphic transaction code based on the transaction account information includes: generating, by the graphic code generation circuit, the graphic transaction code based on the transaction account information and the verification information in the response message.

In some embodiments, the graphic transaction code includes a first graphic transaction code.

It may be seen from the technical solution provided according to the embodiments of the specification that the embodiments of the specification provide a transaction card, including a card body, a power supply, a graphic code generation circuit, and a display device. The power supply, the graphic code generation circuit, and the display device are embedded in the card body. The power supply is connected to the graphic code generation circuit and the display device, respectively. The graphic code generation circuit is configured to generate the graphic transaction code based on transaction account information of the user. The display device is configured to display the graphic transaction code. In this way, when the graphic code generation circuit is disposed in the transaction card, the user may generate the graphic transaction code in real time using the transaction card, for a current transaction to be completed, improving transaction efficiency of the user. Especially, in a case when the terminal device (such as a mobile phone or a tablet) cannot be carried, transaction experience of the user may be improved. Moreover, a subsequent transaction such as a payment may be performed through the graphic transaction code, so that a payment process is safer.

BRIEF DESCRIPTION OF THE DRAWINGS

To describe the technical solutions in embodiments of specification or in the existing technology more clearly, the following briefly describes the accompanying drawings required for describing the embodiments or the existing technology. Apparently, the accompanying drawings in the following description show merely some embodiments of the specification, and a person of ordinary skill in the art may derive other drawings from these accompanying drawings without creative efforts.

ILLUSTRATION OF THE DRAWINGS

10—Card body, 20—Power supply, 21—Power supply button, 30—Graphic code generation circuit, 40—Display device, 50—Communication circuit, 60—Positioning module, 70—Function button.

DETAILED DESCRIPTION OF EMBODIMENTS

Embodiments of the specification provide a transaction card and an information displaying method.

To make a person skilled in the art understands the technical solutions in the specification better, the following describes the technical solutions in the embodiments of the specification with reference to the accompanying drawings in the embodiments of the specification. Apparently, the described embodiments are merely some but not all of the embodiments of the specification. All other embodiments obtained by a person of ordinary skill in the art based on the embodiments of the specification shall fall within the protection scope of the present disclosure.

Embodiment 1

Figure 1:
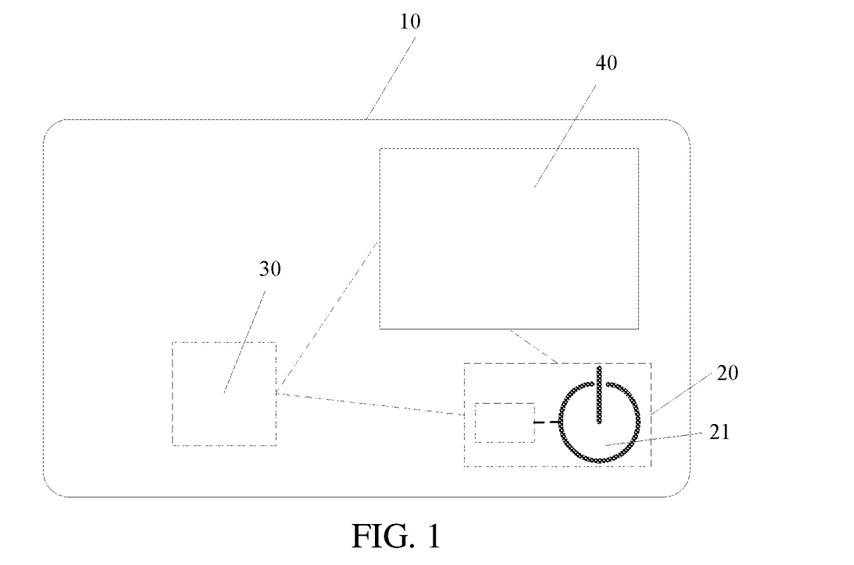
FIG. 1 is a block diagram of a transaction card, according to one example embodiment of the specification.

As shown in FIG. 1, an embodiment of the specification provides a transaction card. The transaction card may be used for an offline transaction process. For example, a user purchases one or more commodities in a mall. After the purchase is completed, the user arrives at a checkout counter for checkout. A cashier may inform the user of a total price after calculating the total price of the commodities purchased by the user. The user may choose to make a payment using a transaction card. Through the transaction card, a merchant may acquire transaction account information of the user and initiate a payment request to the transaction account of the user, to deduct a payment from the transaction account of the user. Therefore, the payment is completed.

The transaction card may include a card body 10, a power supply 20, a graphic code generation circuit 30, and a display device 40.

There may be various shapes of the card body 10. For example, the card body 10 may have a shape of a rectangle, a rectangle with rounded corners, an oval or a square, etc. In an embodiment of the specification, the card body 10 may have a same shape as a shape of a commonly used card such as a bank card or an identity card, which is not limited in the embodiment of the specification. External dimensions of the card body 10 may also be the same as external dimensions of the commonly used card such as the bank card or identity card. For example, the shape of the card body 10 is a rectangle with rounded corners, and the external dimensions of the card body 10 are: a width of 85.6 mm, a height of 53.98 mm, a thickness of 0.76 mm, and a corner radius of 3.18 mm. The card body 10 may be formed by casting of one or more of plastic, rubber, glass, metal, and resin.

The power supply 20 may include a battery and a power supply circuit, and the power supply 20 may provide power for the transaction card. The battery may be disposed in the card body 10, and the battery may be detached from the card body 10 or fixed in the card body 10. The power supply circuit may include a plurality of types, such as a short circuit protection circuit, a current limiting circuit, and a boosting circuit, etc. The power supply circuit may be disposed according to an actual situation, which is not limited in the embodiment of the specification.

The graphic code generation circuit 30 may be configured to generate a graphic code. The graphic code generation circuit 30 may include an algorithm (a graphic code generation algorithm) required to generate the graphic code. The graphic code generation circuit 30 may acquire corresponding information according to a graphic code generation mechanism corresponding to the graphic code generation algorithm and generate the graphic code based on the acquired information. The information acquired by the graphic code generation circuit 30 may include transaction account information of a user, and other information required to generate the graphic code, such as verification information. In a case that verification information is further required to generate the graphic code, the graphic code generation circuit 30 may further include a related algorithm or mechanism for generating the verification information. The algorithm or mechanism may be used for generating an effective graphic code.

The display device 40 may be a module for displaying some contents. The display device 40 may be made of a certain display material. For example, the display device 40 may be an LED display screen, etc. Contents displayed by the display device 40 may be set according to an actual situation. For example, the display device 40 may display the graphic code, weather, and other data to be displayed.

As shown in FIG. 1, the power supply 20, the graphic code generation circuit 30, and the display device 40 may be embedded in the card body 10, respectively. In addition, relative positions of the power supply 20, the graphic code generation circuit 30, and the display device 40 in the card body 10 may be disposed according to an actual situation. Moreover, in addition to the foregoing modules, the card body 10 may further include other related information, such as a card serial number of the transaction card, prompt information (such as information used for prompting the user how to make a payment or related information of the graphic code, etc.) and an image.

Because an operation of each module in the transaction card requires power support, the power supply 20 may be disposed in the transaction card. In addition, each module in the transaction card may be connected to the power supply 20, that is, the power supply 20 is connected to the graphic code generation circuit 30 and the display device 40, respectively. That is to say, the battery in the power supply 20 is connected to the graphic code generation circuit 30 and the display device 40 through a power supply circuit in the power supply 20, respectively. Through the foregoing connection, the power supply 20 may provide power to the graphic code generation circuit 30 and the display device 40 through the battery in the power supply and a corresponding circuit in the power supply circuit. For example, when the user uses the transaction card, the power supply 20 may provide power to the graphic code generation circuit 30 and the display device 40, respectively. The graphic code generation circuit 30 may work normally and generate the graphic code under a support of the power. The display device 40 may illuminate a display screen of the display device 40 under a support of the power, and may display corresponding contents, such as a number, a character, and a graph, according to demands.

As described above, the graphic code generation circuit 30 may include a graphic code generation mechanism or a graphic code generation algorithm. The graphic code generation mechanism or graphic code generation algorithm may be set according to an actual situation. The graphic code generation circuit 30 may acquire user-related information, such as the transaction account information of the user, based on the graphic code generation mechanism and graphic code generation algorithm. Afterwards, the graphic transaction code may be used through the graphic code generation mechanism and graphic code generation algorithm based on the transaction account information of the user. The display device 40 may display a graphic transaction code generated by the graphic code generation circuit 30.

It should be noted that there may be plurality of processing methods in which the graphic code generation circuit 30 generates the graphic transaction code based on the transaction account information of the user. For example, the graphic code generation circuit 30 may generate a graphic transaction code based on a predetermined graphic code generation mechanism and graphic code generation algorithm, and the transaction account information of the user when the transaction card is offline. Alternatively, the transaction card may further perform data interaction with a server to acquire related information for generating the graphic code, and generate the graphic transaction code based on the related information and the transaction account information of the user. In addition, the graphic transaction code generated by the graphic code generation circuit 30 may be further combined with a word of mouth code or a discount code, etc., to implement a corresponding promotional activity and the like. Moreover, in a case of an offline state, the graphic code generation circuit 30 may further buffer a plurality of graphic transaction codes to be used in a subsequent transaction such as a payment.

Besides, in order to save power of the transaction card, after the user completes a use of the transaction card, the power supply may be turned off in time. Turn-off of the power output of the power supply 20 may be implemented in a plurality of manners. For example, the power supply 20 may use a timer to control turn-on and turn-off of the power supply 20. For example, the timer is set as 30 seconds. When the display device 40 is powered on, and the timer starts timing for 30 seconds, if contents displayed in the display device always keeps unchanged, the power supply 20 may be turned off. Alternatively, a power supply button 21 may be disposed. As shown in FIG. 1, after the user completes the use of the transaction card, the power supply button 21 may be pressed, the transaction card may turn off the power supply to disconnect a power supply to each module in the transaction card.

The transaction card with the foregoing structure may be applied to a plurality of practical scenes, for example, schools such as an elementary school, a junior high school, or a high school. In a case that a student may have a transaction account (such as an Alipay account, etc.) but do not have a terminal device (such as a mobile phone or a tablet) to be carried at any time, the student may purchase a commodity or consume in a dining hall through the foregoing transaction card. In particular, after the student purchases the commodity, the student may go to a checkout counter for checkout. The cashier may inform the student of a total price after calculating the total price of the purchased commodity. The student may press the power supply button 21 in the transaction card. The power supply 20 in the transaction card may supply power to the graphic code generation circuit 30 and the display device 40, respectively. Simultaneously, the graphic code generation circuit 30 acquires the transaction account information (such as Alipay™ account information, etc.) of the student, and generates a graphic transaction code accordingly, and the display device 40 may display the graphic transaction code. The student may provide the graphic transaction code to the cashier. The cashier may initiate a payment request to the transaction account of the student based on related information in the graphic transaction code by scanning, by a code scanning device, the graphic transaction code, for a transaction account of the student to be deducted. Therefore, a payment and purchase process are completed.

In addition to application to the school, the transaction card may be further applied to a specific closed environment such as a gym, an amusement park, etc. in which a terminal device cannot be carried, or a scenario in which a foreign tourist travels to China, or in some countries or cities, etc. with a particularly high credit card holding rate, which is not limited in the embodiment of the specification.

An embodiment of the specification provides a transaction card, including: a card body, a power supply, a graphic code generation circuit, and a display device. The power supply, the graphic code generation circuit, and the display device are embedded in the card body. The power supply is connected to the graphic code generation circuit and the display device, respectively. The graphic code generation circuit is configured to generate the graphic transaction code based on transaction account information of the user. The display device is configured to display the graphic transaction code. In this way, when the graphic code generation circuit is disposed in the transaction card, the user may generate the graphic transaction code in real time using the transaction card, for a current transaction to be completed, improving transaction efficiency of the user. Especially, in a case when the terminal device (such as a mobile phone or a tablet) cannot be carried, transaction experience of the user may be improved. Moreover, a subsequent transaction such as a payment may be performed through the graphic transaction code, so that a payment process is safer.

Embodiment 2

Figure 2:
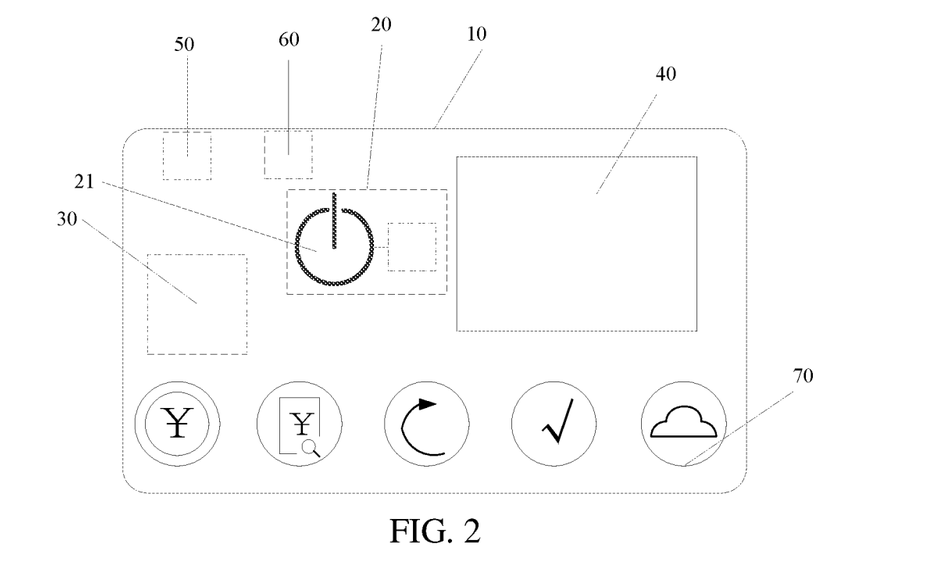
FIG. 2 is a block diagram of another transaction card, according to one example embodiment of the specification.

As shown in FIG. 2, an embodiment of the specification provides a transaction card. The transaction card includes all the functional units of the transaction card shown in FIG. 1, and is improved based on this. Improvements are shown below:

In order to ensure security of the transaction account of a user, a graphic code generation circuit 30 may periodically change a graphic transaction code. In this manner, a graphic transaction code generated by the user at a certain time has a certain validity period. Within the validity period, payment may be made through the graphic transaction code. If the graphic transaction code exceeds the validity period, payment cannot be made using the graphic transaction code. Accordingly, it may be prevented that intercept of the graphic transaction code by others pose a threat to the transaction account of the user. Therefore, the graphic code generation circuit 30 generates a new graphic transaction code every predetermined duration, and replaces a graphic transaction code displayed by a display device 40 with the new graphic transaction code. The predetermined duration may be set according to an actual situation, such as 30 seconds or 1 minute. In the foregoing method, the graphic transaction code displayed by the display device 40 may be automatically changed every predetermined duration. Accordingly, security of the transaction account of the user is ensured, and the user may perform a normal transaction such as payment.

In addition, in order to cause the transaction card to perform data interaction with an external device, a communication circuit 50 may be disposed for the transaction card. Through the communication circuit 50, the transaction card may perform data transmission with a server and/or a terminal device. Accordingly, the communication circuit 50 may include one or more of a Wi-Fi module, a near field communication circuit, and a radio frequency module. The near field communication circuit may be a module that may implement a non-contact point-to-point data transmission between devices, and may be specifically a Bluetooth module, an NFC (Near Field Communication) module, etc. The radio frequency module may be a module that transmits a radio waves with a certain frequency to a receiver for driving a receiver circuit to output corresponding data.

Because the communication circuit 50 is also a power consumption module, the communication circuit 50 may be connected to a power supply 20, and the power supply 20 may provide power to the communication circuit 50. Because a main function of the communication circuit 50 is to send and receive data, and for data processing, the communication circuit 50 often needs to provide corresponding data to a corresponding module for processing. The communication circuit 50 may be further connected to the graphic code generation circuit 30 and the display device 40. The communication circuit 50 may send a data acquisition request to the server, and may receive data returned by the server. Alternatively, the communication circuit 50 (such as an NFC module/circuit or a Bluetooth module/circuit) may further perform a short-range data interaction with a terminal device (such as a mobile phone or a tablet).

In a practical application, the communication circuit 50 may acquire, from the server, relevant information, such as verification information, required to generate a graphic transaction code. The communication circuit 50 may send the related information to the graphic code generation circuit 30 to generate a graphic transaction code on line. In addition, as described above, the graphic code generation circuit 30 may periodically generate a graphic transaction code, for the graphic transaction code displayed by the display device 40 to be dynamically changed, improving security of the transaction account of the user. The communication circuit 50 may further establish a connection with the terminal device of the user through a near field communication or radio frequency. In this way, the user may conveniently view related information in the transaction card, such as remaining sum information, personal information of the user, and recent transaction information, etc. In addition, the communication circuit 50 may further acquire a word of mouth code or a discount code from the server. The graphic code generation circuit 30 may generate a graphic transaction code with a discount and abatement in combination with information such as the word-of-mouth code or discount code, for the user to participate in a corresponding promotional activity and enjoy a corresponding discount and abatement.

In addition, in order to find a lost transaction card in time, or find a user (such as an elderly person) who carries a transaction card, a positioning module 60 may be set for the transaction card. Because the positioning module 60 is also a power consumption module, the positioning module 60 may be connected to the power supply 20, and the positioning module 60 may be powered on through the power supply 20. The positioning module 60 may be further connected to the display device 40, and the positioning module 60 may be configured to acquire current position information and display the position information through the display device 40. The positioning module 60 may be a GPS module, a Beidou positioning module, a Galileo positioning module, etc., which is not limited in the embodiment of the specification.

In addition, in order to enrich functions of the transaction card, in addition to the foregoing modules and implementing the foregoing functions, the transaction card may be further provided with a plurality of functions, such as querying a remaining sum, querying historical transaction information, and querying weather information. The foregoing functions may be implemented by triggering a function button. In particular, the transaction card further includes a function button 70. The function button 70 may be a button or include a plurality of buttons. The function button 70 may be disposed in a designated area or an arbitrary area on the card body 10. For a plurality of function buttons 70, the plurality of function buttons 70 may be distributed on the card body 10 in a predetermined distribution manner or randomly.

In a practical application, if the function button 70 includes a button, different functions may be started in a predetermined triggering manner. For example, if the function button 70 is pressed once within a predetermined duration (for example, within 3 seconds), a function of querying the remaining sum may be started. If the function button 70 is pressed twice within a predetermined duration (for example, within 3 seconds, etc.), a function of querying historical transaction information may be started, etc. If the function button 70 includes a plurality of buttons, one button may be set for each function. As shown in FIG. 2, the transaction card includes a plurality of function buttons 70, including a function button for querying historical transaction information, a function button for querying the remaining sum, a return button, a confirmation button, and a function button for querying weather information, etc. In a practical application, the function button 70 includes not only a plurality of the foregoing function buttons, but also includes other function buttons, which may be disposed according to an actual condition.

In addition, the function button 70 may be connected to the power supply 20 for the power supply 20 to supply power to a corresponding trigger circuit of the function button 70. Simultaneously, the function button 70 may be connected to the display device 40 and the communication circuit 50. In this manner, when the user presses the function button 70, the function button 70 is triggered. In this case, information corresponding to the function button may be requested to the server through the communication circuit 50, and the information corresponding to the function button may be displayed through the display device 40. For example, as shown in FIG. 2, if the user needs to query the remaining sum information of the transaction account, the user may press the function button for querying the remaining sum. In this case, the transaction card may generate a remaining sum query request, and may send the query request to the server through the communication circuit 50. The server may acquire the remaining sum information in the transaction account of the user and send the remaining sum information to the transaction card. The transaction card receives the remaining sum information through the communication circuit 50 and may send the remaining sum information to the display device 40 for display. In this way, the user may view the remaining sum information in the transaction account.

In addition, considering that payment and payment collection usually occur during a transaction, the graphic transaction code generated by the graphic code generation circuit 30 may include two types of graphic transaction codes: one may be a graphic transaction code for payment collection, and the other may be a graphic transaction code for payment. Accordingly, the graphic code generation circuit 30 may be configured to generate a first graphic transaction code and/or a second graphic transaction code. The second graphic transaction code may be a graphic payment collection code (that is, a graphic transaction code for payment collection). The first graphic transaction code is a graphic payment code (that is, a graphic transaction code for payment).

If the graphic code generation circuit 30 may be configured to generate the first graphic transaction code and the second graphic transaction code, the display device 40 may perform a distinguishable display on the graphic transaction code in a predetermined display manner. For example, the first graphic transaction code may be displayed normally, and the second graphic transaction code may be displayed in a manner of gradual change of luminance. Alternatively, a switch button may be disposed for generating different graphic transaction codes. In a case of default, the display device 40 displays the first graphic transaction code. When the user presses the switch button, the display device 40 displays the second graphic transaction code.

In addition, considering that a graphic transaction code for payment collection (that is, a graphic payment collection code) often does not pose a threat to the transaction account of the user, the graphic payment collection code may be fixed on the transaction card. Therefore, the graphic code generation circuit 30 may be configured to generate the first graphic transaction code. The transaction card further includes a second graphic transaction code. The second graphic transaction code is disposed in a predetermined area of the card body 10. The predetermined area may be any area of the card body 10, which is specifically disposed according to an actual situation. For example, the display device 40 and the function button 70, etc. may be disposed on one side of the card body 10, and the second graphic transaction code may be disposed on the other side of the card body 10, etc.

In addition, in order to cause the transaction card as similar to other cards in appearance as much as possible, when the display device 40 is selected, a relatively thin display component may be selected as much as possible. Accordingly, in an embodiment of the specification, the display device 30 may include electronic paper.

In addition, the graphic transaction codes (including the first graphic transaction code and the second graphic transaction code) mentioned in the embodiment of the specification may include a plurality of types. For example, the graphic transaction code may be a bar code, a QR code, or a password code.

An embodiment of the specification provides a transaction card, including: a card body, a power supply, a graphic code generation circuit, and a display device. The power supply, the graphic code generation circuit, and the display device are embedded in the card body. The power supply is connected to the graphic code generation circuit and the display device, respectively. The graphic code generation circuit is configured to generate the graphic transaction code based on transaction account information of the user. The display device is configured to display the graphic transaction code. In this way, when the graphic code generation circuit is disposed in the transaction card, the user may generate the graphic transaction code in real time using the transaction card, for a current transaction to be completed, improving transaction efficiency of the user. Especially, in a case when the terminal device (such as a mobile phone or a tablet) cannot be carried, transaction experience of the user may be improved. Moreover, a subsequent transaction such as a payment may be performed through the graphic transaction code, so that a payment process is safer.

Embodiment 3

Figure 3:
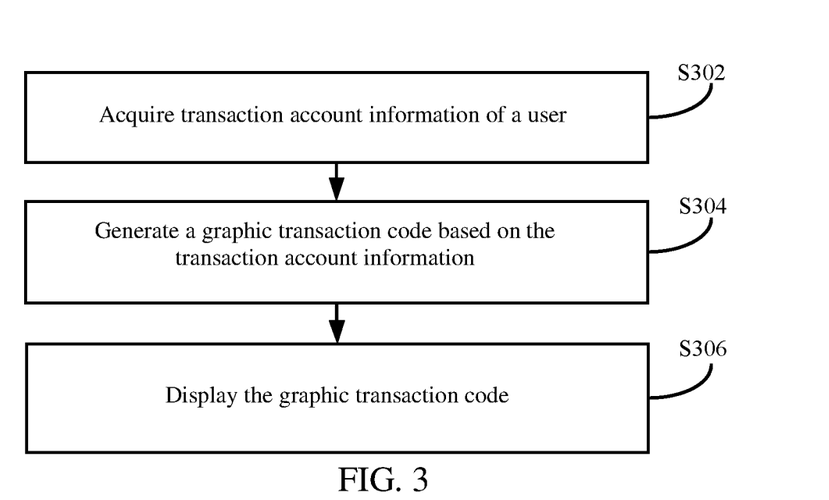
FIG. 3 is a flow chart of an information displaying method, according to one example embodiment of the specification.

The foregoing is a transaction card provided by an embodiment of the specification. The transaction card includes a card body, a power supply, a graphic code generation circuit, and a display device. Based on the transaction card and a composition structure of the transaction card, an embodiment of the specification further provides an information displaying method. An execution subject of the method may be the transaction card provided in the foregoing embodiment. For the compositional structure of the transaction card, reference may be made to related contents in the foregoing first embodiment and second embodiment, and details are not described herein again. As shown in FIG. 3, the method may include at least the following steps.

In step S302, transaction account information of a user may be acquired.

In implementation, for example, a user purchases a commodity in a mall, and goes to a checkout counter for checkout. A cashier may inform the user of a total price after calculating the total price of the commodity purchased by the user. The user may choose to make a payment with a transaction card. In this case, the user may press a power supply button 21 in the transaction card, and a power supply 20 in the transaction card may supply power to a graphic code generation circuit 30 and a display device 40, respectively. Simultaneously, the graphic code generation circuit 30 may analyze related information to be acquired through a predetermined graphic code generation algorithm. The related information may include transaction account information (such as Alipay account information, etc.) of the user. Afterwards, the graphic code generation circuit 30 may acquire the transaction account information of the user, and other required information, etc.

In step S304, a graphic transaction code is generated based on the transaction account information.

In implementation, the graphic code generation circuit 30 in the transaction card may generate the graphic transaction code according to the transaction account information of the user and other required information.

In step S306, the foregoing graphic transaction code is displayed.

Figure 4:
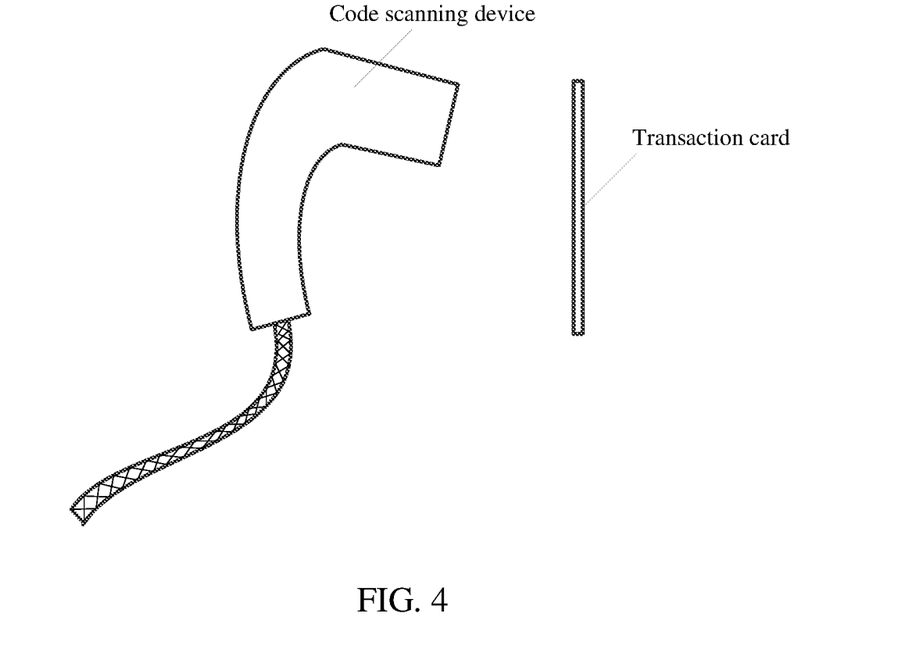
FIG. 4 is a schematic diagram of a payment through a transaction card, according to one example embodiment of the specification.

In implementation, the graphic code generation circuit 30 may send the generated graphic transaction code to the display device 40, and the display device 40 may display the graphic transaction code. As shown in FIG. 4, the user may provide the graphic transaction code to a cashier. The cashier may initiate a payment request based on related information in the graphic transaction code by scanning, by a code scanning device, the foregoing graphic transaction code, for a deduction to be performed from the transaction account of the user. Therefore, a payment and purchase process are completed.

An embodiment of the specification provides an information displaying method. The information displaying method may be applied to a transaction card. The transaction card may include: a card body, a power supply, a graphic code generation circuit, and a display device. The power supply, the graphic code generation circuit, and the display device are embedded in the card body. The power supply is connected to the graphic code generation circuit and the display device, respectively. The graphic code generation circuit is configured to generate the graphic transaction code based on transaction account information of the user. The display device is configured to display the graphic transaction code. In this way, when the graphic code generation circuit is disposed in the transaction card, the user may generate the graphic transaction code in real time using the transaction card, for a current transaction to be completed, improving transaction efficiency of the user. Especially, in a case when the terminal device (such as a mobile phone or a tablet) cannot be carried, transaction experience of the user may be improved. Moreover, a subsequent transaction such as a payment may be performed through the graphic transaction code, so that a payment process is safer.

Embodiment 4

Figure 5:
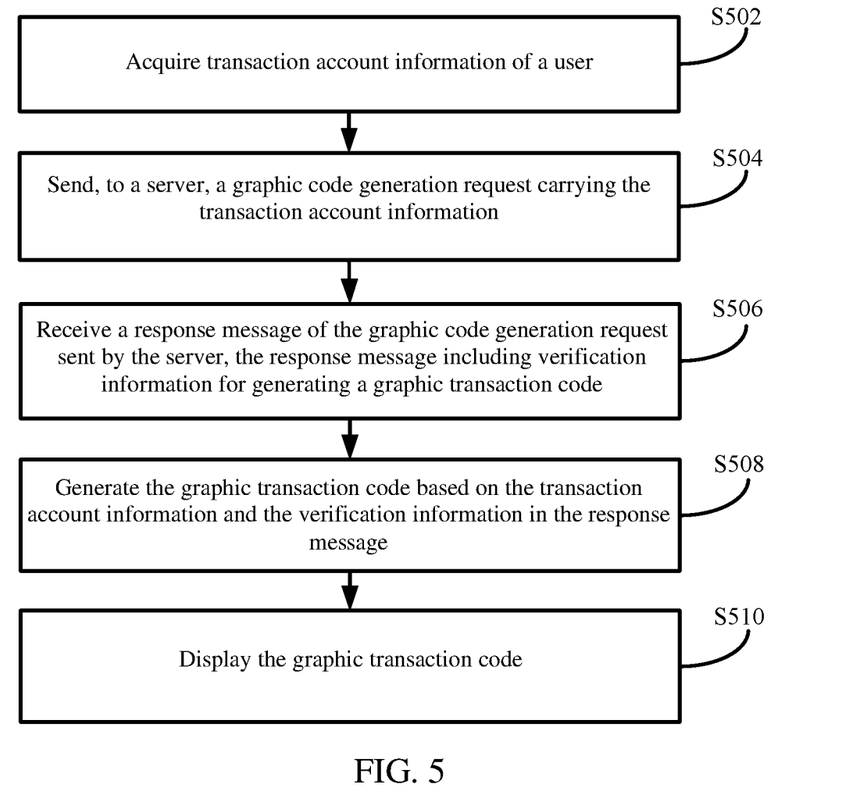
FIG. 5 is a flow chart of another information displaying method, according to one example embodiment of the specification.

An embodiment of the specification further provides an information displaying method. An execution subject of the method may be the transaction card provided in the foregoing embodiment. For a compositional structure of the transaction card, reference may be made to related contents in the foregoing first embodiment and second embodiment, and details are not described herein again. As shown in FIG. 5, the method may include at least the following steps.

In step S502, transaction account information of a user may be acquired.

Contents of the step S502 is the same as contents of the step S302 in the third embodiment. For a specific processing process of step S502, reference may be made to the related contents of step S302 in the third embodiment, and details are not described herein again.

Figure 6:
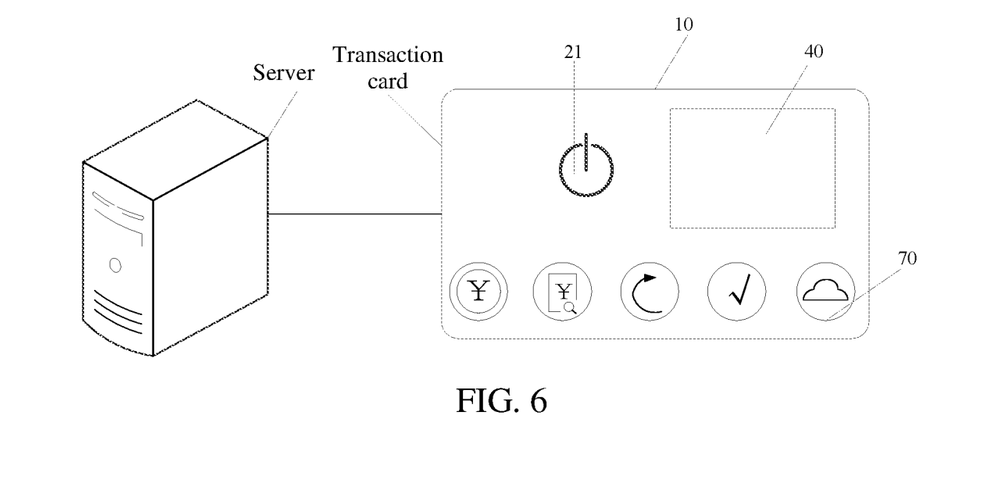
FIG. 6 is a diagram of an information displaying system, according to one example embodiment of the specification.

The transaction card may further include a communication circuit 50. Correspondingly, an information displaying system may be shown in FIG. 6. A graphic transaction code may be disposed through a processing process of step S504-step S510 below.

In step S504, a graphic code generation request carrying the foregoing transaction account information is sent to a server.

In step S506, a response message of the graphic code generation request sent by the server is received, the response message including verification information required to generate a graphic transaction code.

In step S508, the graphic transaction code is generated based on the transaction account information and the verification information in the response message.

In implementation, the graphic code generation circuit 30 in the transaction card may generate the graphic transaction code according to the transaction account information of the user, the verification information in the response message, and other required information.

It should be noted that the graphic transaction code may include a first graphic transaction code and a second graphic transaction code. The second graphic transaction code may be a graphic payment collection code used for payment collection. The first graphic transaction code is a graphic payment code used for payment. In addition, the graphic payment collection code usually does not pose a threat to the transaction account of the user. Therefore, the graphic transaction code may further only include the first graphic transaction code.

In step S510, the foregoing graphic transaction code is displayed.

In implementation, the graphic code generation circuit 30 may send the generated graphic transaction code to the display device 40, and the display device 40 may display the graphic transaction code. The user may provide the graphic transaction code to a cashier. The cashier may initiate a payment request based on related information in the graphic transaction code by scanning, by a code scanning device, the foregoing graphic transaction code, for a deduction to be performed from the transaction account of the user. Therefore, a payment and purchase process are completed.

An embodiment of the specification provides an information displaying method. The information displaying method may be applied to a transaction card. The transaction card may include: a card body, a power supply, a graphic code generation circuit, and a display device. The power supply, the graphic code generation circuit, and the display device are embedded in the card body. The power supply is connected to the graphic code generation circuit and the display device, respectively. The graphic code generation circuit is configured to generate the graphic transaction code based on transaction account information of the user. The display device is configured to display the graphic transaction code. In this way, when the graphic code generation circuit is disposed in the transaction card, the user may generate the graphic transaction code in real time using the transaction card, for a current transaction to be completed, improving transaction efficiency of the user. Especially, in a case when the terminal device (such as a mobile phone or a tablet) cannot be carried, transaction experience of the user may be improved. Moreover, a subsequent transaction such as a payment may be performed through the graphic transaction code, so that a payment process is safer.

Embodiments of the specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) (for example, a field programmable gate array (FPGA)) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the microprocessor or processor, a logic gate, a switch, an application specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application specific integrated circuit, programmable logic controller, and embedded microcontroller and other forms by performing a logic programming on the method steps to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of one or more embodiments of the specification, the function of the units may be implemented in a same piece of or multiple pieces of software and/or hardware.

A person skilled in the art should understand that the embodiments of the specification may be provided as a method, a system, or a computer program product. Therefore, the one or more embodiments of the specification may use a form of hardware only embodiments, software only embodiments, or embodiments with a combination of software and hardware. Moreover, the one or more embodiments of the specification may use a form of a computer program product that is implemented on one or more computer-usable storage media (including but not limited to a disk memory, a CD-ROM, an optical memory, and the like) that include computer-usable program code.

The embodiments of the specification is described with reference to the flowcharts and/or block diagrams of the method, the device (system), and the computer program product according to the embodiments of the specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may also be stored in a computer-readable memory that can guide a computer or another programmable data processing device to work in a specific manner, so that the instructions stored in the computer-readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer-readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage devices or any other non-transmission media that may be configured to store information that a computing device can access. Based on the definition in the specification, the computer-readable medium does not include transitory computer readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one . . . ." does not exclude other same elements in the process, method, article or device which include the element.

A person skilled in the art should understand that the embodiments of the specification may be provided as a method, a system, or a computer program product. Therefore, the one or more embodiments of the specification may use a form of hardware only embodiments, software only embodiments, or embodiments with a combination of software and hardware. Moreover, the one or more embodiments of the specification may use a form of a computer program product that is implemented on one or more computer-usable storage media (including but not limited to a disk memory, a CD-ROM, an optical memory, and the like) that include computer-usable program code.

The one or more embodiments of the specification can be described in the general context of computer-executable instructions executed by a computer, for example, a program module. Generally, the program module includes a routine, a program, an object, a component, a data structure, and the like for executing a particular task or implementing a particular abstract data type. The one or more embodiments of the specification may also be practiced in distributed computing environments in which tasks are performed by remote processing devices that are connected by using a communications network. In a distributed computing environment, the program module may be located in both local and remote computer storage media including storage devices.

The embodiments in the specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. A transaction card corresponding to a server that provides a transaction service, the transaction card comprising: a card body, a power supply, a communication circuit, a graphic code generation circuit, and a display device, wherein:
   the power supply, the graphic code generation circuit, and the display device are embedded within the card body, and the power supply is connected to the graphic code generation circuit and the display device;
   the communication circuit is connected to the power supply, the graphic code generation circuit, and the display device, and configured to receive target information sent by the server for the transaction card and/or sending a target request message to the server, and the communication circuit includes a near field communication circuit configured to communicate with a user terminal via a near field communication connection;
   the graphic code generation circuit is configured to:
      generate, when the transaction card is not connected to the server, a first graphic payment code and a graphic payment collection code based on transaction account information of a user; and
      periodically generate a new graphic payment code, and replace the first graphic payment code displayed by the display device with the new graphic payment code; and
   the display device is configured to sequentially display the first graphic payment code and the new graphic payment code with a constant luminance, and display the graphic payment collection code with a gradual change of luminance.

2. The transaction card according to claim 1, wherein the communication circuit further comprises one or more of a Wi-Fi module and a radio frequency module.

3. The transaction card according to claim 1, wherein the transaction card further comprises a positioning module, the positioning module being connected to the power supply and the display device, and the positioning module being configured to acquire current location information and displaying the current location information through the display device.

4. The transaction card according to claim 1, wherein the transaction card further comprises a function button, the function button being connected to the power supply, the display device, and the communication circuit, wherein after the function button is pressed, information corresponding to the function button is sent from the server through the communication circuit, and the information corresponding to the function button is displayed through the display device.

5. The transaction card according to claim 1, wherein the graphic payment collection code is disposed in an area of the transaction card.

6. The transaction card according to claim 1, wherein the display device includes electronic paper.

7. The transaction card according to claim 1, wherein the graphic transaction code is a bar code, a QR code, or a password code.

8. An information displaying method applied to a transaction card, wherein the transaction card corresponds to a server that provides a transaction service and comprises a card body, a power supply, a communication circuit, a graphic code generation circuit, and a display device, wherein the power supply, the communication circuit, the graphic code generation circuit, and the display device are embedded within the card body, and the power supply is connected to the communication circuit, the graphic code generation circuit and the display device, and the method comprises:
acquiring, by the communication circuit, the transaction account information of a user;
generating, by the graphic code generation circuit when the transaction card is not connected to the server, a first graphic payment code and a graphic payment collection code based on the transaction account information, wherein the graphic code generation circuit periodically generates a new graphic payment code, and replaces the first graphic payment code displayed by the display device with the new graphic payment code;
sequentially displaying, by the display device, the first graphic payment code and the new graphic payment code with a constant luminance; and
displaying, by the display device, the graphic payment collection code with a gradual change of luminance.

9. The method according to claim 8, wherein after acquiring transaction account information of the user, the method further comprises:
sending, to the server, a graphic code generation request carrying the transaction account information; and
receiving, from the server, a response message corresponding to the graphic code generation request, the response message comprising verification information for generating a graphic transaction code.

10. The method according to claim 9, further comprising:
generating, by the graphic code generation circuit, the graphic transaction code based on the transaction account information and the verification information in the response message.

11. A non-transitory computer-readable storage medium storing instructions executable by a transaction card, wherein the transaction card corresponds to a server that provides a transaction service and comprises a card body, a power supply, a communication circuit, a graphic code generation circuit, and a display device, wherein the power supply, the communication circuit, the graphic code generation circuit, and the display device are embedded within the card body, and the power supply is connected to the communication circuit, the graphic code generation circuit, and the display device, wherein the instructions cause the transaction card to perform operations comprising:
acquiring, by the communication circuit, the transaction account information of a user;
generating, by the graphic code generation circuit when the transaction card is not connected to the server, a first graphic payment code and a graphic payment collection code based on the transaction account information, wherein the graphic code generation circuit periodically generates a new graphic payment code, and replaces the first graphic payment code displayed by the display device with the new graphic payment code;
sequentially displaying, by the display device, the first graphic payment code and the new graphic payment code with a constant luminance; and
displaying, by the display device, the graphic payment collection code with a gradual change of luminance.

12. The non-transitory computer-readable storage medium according to claim 11, wherein after acquiring transaction account information of the user, the operations further comprises:
sending, to the server, a graphic code generation request carrying the transaction account information; and
receiving, from the server, a response message corresponding to the graphic code generation request, the response message comprising verification information for generating a graphic transaction code.

13. The method according to claim 12, wherein the operations further comprises:
generating, by the graphic code generation circuit, the graphic transaction code based on the transaction account information and the verification information in the response message.

* * * * *